United States Patent Office 3,440,009
Patented Apr. 22, 1969

3,440,009
PROCESSING OF SPENT HYDROCHLORIC
ACID PICKLE LIQUOR
Harold W. Flood, South Acton, Charles L. Kusik, Cambridge, and Frank J. Tremblay, Dracut, Mass., assignors to Arthur D. Little Inc., Cambridge, Mass., a corporation of Massachusetts
Filed July 19, 1966, Ser. No. 566,342
Int. Cl. C01b 7/08
U.S. Cl. 23—154                                         5 Claims

ABSTRACT OF THE DISCLOSURE

A process for regenerating pickle liquor during steel pickling operations which reclaims ferric oxide in a granular form of large enough size to be usable in iron making processes. The granules are formed in a fluidized bed which is directly heated by combustion gases. The hydrochloric acid is also reclaimed for continuous use by further processing through a solid contaminant separator and absorption column.

Figure 1:
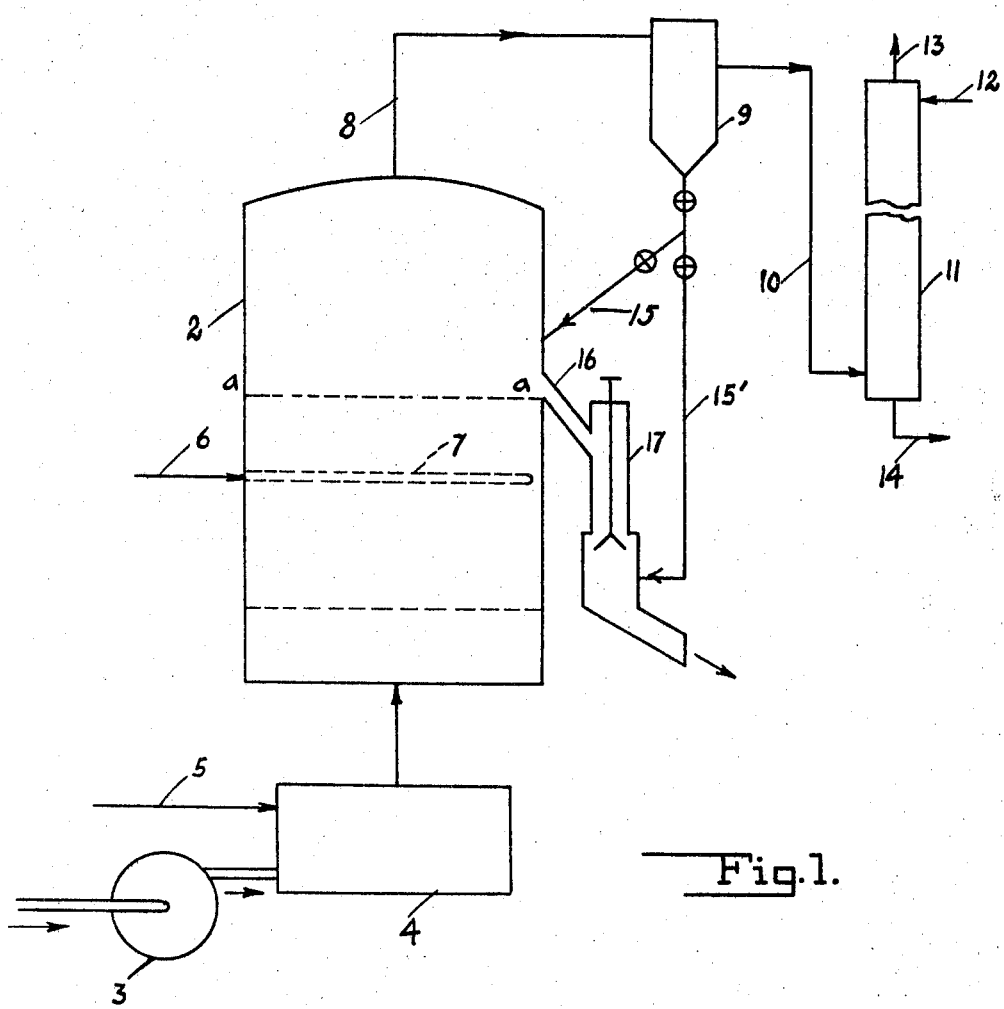

This invention relates to the processing of spent hydrochloric acid pickle liquor or like solutions containing ferrous chloride, usually with some unreacted hydrochloric acid, for the regeneration of hydrochloric acid and recovery of the iron as ferric oxide. It is in the nature of an improvement in the method disclosed in application Ser. No. 324,479, filed Nov. 18, 1963 by M. W. Robinson, Jr., et al. now Patent No. 3,310,435, and assigned to the assignee of this application.

It is of course well known in the art to use hydrochloric acid for the pickling of steel, and that the pickling solution is effective under the conditions of use only so long as the unreacted hydrochloric acid remains above a definite level. The acid so used reacts with the surface of the metal to clean it and remove scale, so that as the solution is used, the acid is depleted and iron chloride is produced. As disclosed in the said copending application the spent solution containing unreacted hydrochloric acid and iron chloride is sprayed into a closed environment where the spray mingles with hot combustion gases which may or may not contain moisture, whereby the iron chloride is reacted to produce iron oxide and hydrogen chloride, unreacted HCl is released from solution, and the water is converted to steam. This is known as the spray-roaster process and the effluent gases from the spray roaster pass through a dust collector to remove the gas-borne iron oxide after which the vapors are contacted with water in an absorber to dissolve the HCl and thereby recover hydrochloric acid for re-use in pickling.

A commercial obstacle to the use of this process is that the iron oxide which is recovered is a very fine powder or dust which is difficult to effectively remove from the effluent gases, and that which is removed is metallurgically unsatisfactory since it is too fine to be used in a blast furnace and is difficult to sinter, pelletize or briquette. Some dust so produced may be used for pigment or other purposes unrelated to steel production, but the process yields such quantities that the principal economical way to use the oxide would be for the recovery of the iron.

The present invention is for a method for the treating of the spent hydrochloric acid pickle liquor in such manner as to regenerate the hydrochloric acid but recover substantially all of the ferric oxide in a granular form in which it is readily prepared for use in a steel making operation for the recovery of the iron. Problems of separating out the ferric oxide are reduced by our method where the oxide or a greater part of it is in this granular form. A further object is to provide a method which permits use of smaller and more compact apparatus that lends itself to improved plant layout, and the operation of which is more economical.

According to the present invention, the spent pickle liquor, which may previously have been concentrated by the removal of some of the water as hereinafter described or as disclosed in a copending application of Robert J. Allison and Paul E. Hatfield, Ser. No. 566,310, filed July 19, 1966, and assigned to the same assignee as this application, is introduced into a fluidized bed reactor having a bed of inert material, such as ferric oxide and operated at a temperature of about 1535° F. We have found that at about this temperature and with the use of a fluidized bed a very substantial amount of the oxide will be of bead-like granular character, and dust which is provided in small amounts may be recycled to the bed and thereby converted to such granules so that the overall production of the oxide as a dust is relatively negligible. As the temperature drops below 1535° F. dust production increases, while little advantage is apparent by going to a higher temperature, and the upper limit of temperature should be below the point where ferric oxide will fuse. The fluidizing gas is a combustion product ranging from a slightly reducing mixture to 50% excess air. Preferred operating conditions using natural gas as a fuel employ an excess of air to provide for the oxygen required in formation of $Fe_2O_3$ from $FeCl_2$, $H_2O$, and oxygen in acordance with the following equation:

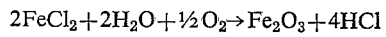

$$2FeCl_2 + 2H_2O + \tfrac{1}{2}O_2 \rightarrow Fe_2O_3 + 4HCl$$

Also, temperature control of the bed may be secured by regulating the rate at which fuel is burned, and the amount of excess air. The liquid feed to the bed must of course be regulated to maintain a proper bed temperature.

Figure 2:
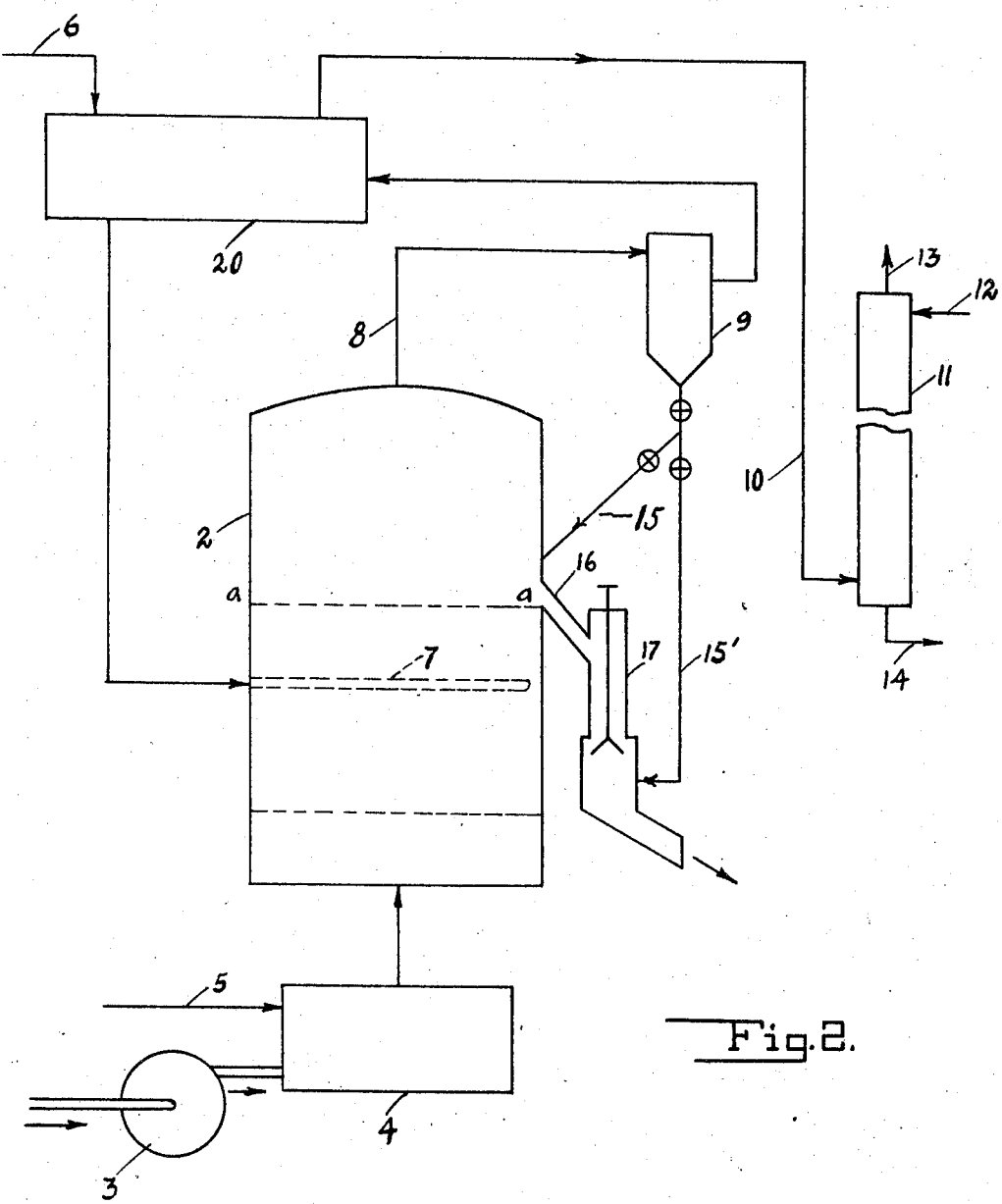

The invention may be more fully explained in conjunction with the accompanying drawings, in which:

FIG. 1 is a schematic diagram illustrating the most elementary embodiment of our invention in which there is no preheating of the pickle liquor and no heat recovery; and FIG. 2 is a similar view with preheating and concentrating of the feed liquid through heat exchange with the hot gases from the fluidized bed reactor.

Referring first to FIG. 1 of the drawing, 2 designates a closed vessel containing a bed of inert granular material such as ferric oxide, but sand may be used at start-up. The top of the bed is indicated by the line a—a. An air compressor 3 supplies ambient air under pressure to a combustion chamber 4 which is supplied with natural gas through pipe 5. The hot products of combustion enter the bottom of the fluidized bed and rising through the bed agitate or fluidize it in a manner well understood in the art. In some cases the fuel and air may be first brought together and burned in the bed itself.

The pickle liquor is fed into the bed of the reactor. It is supplied through pipe 6 with a distributing discharge outlet 7 through which it is discharged into the bed.

The gaseous reaction products, water vapor and products of combustion, are discharged through a duct 8 into a cyclone separator 9 for removal of entrained iron oxide, and from the cyclone separator they are conveyed through duct 10 to the bottom of an absorption column 11 up which they flow countercurrent to water entering the top of the column through pipe 12. Unabsorbed gases and vapor are discharged from the top of the column through vent pipe 13, and regenerated hydrochloric acid is drawn off through pipe 14 at the bottom of the column. Provision is made for selectively recycling dust from the cyclone generator through pipe 15, or discharging it through pipe 15', each pipe having valve means therein.

The iron oxide which accumulates in the bed is carried off in any conventional manner, either from the bottom of the reactor or by an overflow outlet 16 in which is a discharge valve 17.

All of the apparatus is per se known in the art, for which reason it is only schematically shown.

Based on pilot plant operations, a commercial operation for a pickling line for processing 200 tons of metal per hour would typically provide 15,300 lbs. of pickle liquor per hour. The feed composition would average 30% of $FeCl_2$, 1% HCl, and the balance water. The inside diameter of the bed has an estimated diameter of 12.25 feet, a depth of about 36 inches. The air compressor delivers an estimated 10,400 c.f.m. to the combustion chamber calculated at 70° F. temperature and natural gas is supplied at the rate of 58,500 s.c.f.h. The combustion gases in the pilot plant were at a temperature of about 1600° F., but it is calculated that with improved burner design and equipment these gases will be around 2800° F. and have a superficial velocity of 6 ft./sec. There is about 50% excess oxygen above the stoichiometric amount required by the natural gas. The fluidized bed is operated at a temperature of 1535° F. When conditions of equilibrium are established, the output of iron oxide, $Fe_2O_3$, is about 2900 lbs. per hour. At a bed temperature of 1535° F. the oxide is mostly in the form of small bead-like granules, and is removed from the bed as overflow, or from the bottom of the reactor according to the removal system which is used. As the bed temperature drops appreciably below about 1535° F. more of the oxide is dust and carried out by the effluent gases. There is no apparent advantage in operating the bed substantially above a level in the general area of 1535° F., and it must of course be at a temperature where fusion of the bed does not take place. The figure of 1535° F. was derived from pilot plant operation, and in a commercial unit temperatures may rise a hundred or even more degrees above this level, and the figure here given is an indication of a general area and is not to be strictly confined.

The gases leaving the reactor are at a temperature of about 1535° F. and the composition generally is as follows:

|  | Mole percent |
|---|---|
| $O_2$ | 0.9 |
| $N_2$ | 53.6 |
| $CO_2$ | 6.5 |
| $H_2O$ | 35.8 |
| HCl | 3.2 |

If the feed rate of the bed is changed, the fuel and air supply is also changed to maintain the bed temperature.

In FIG. 2 the apparatus is generally the same as that shown in FIG. 1 and corresponding reference numerals have been used to desingate corresponding parts. However, interposed between the cyclone and the absorption column is an evaporator 20 for preheating and evaporating the feed liquor by heat exchange with the hot gases from the reactor, and the feed liquor passes through this evaporator before being discharged into the fluidized bed.

In this case, unreacted HCl in the feed is vaporized in the evaporator and carried with the gases from the reactor into the absorber. Because of the preliminary concentration, based on an initial input to the evaporator of 15,300 lbs. of pickle liquor per hour of the same composition as above, the feed to the bed, according to estimates based on laboratory operation, will be about 45% $FeCl_2$, HCl—0% and the balance principally water. It is estimated that because of the lower volume of water entering the fluidized bed, a bed diameter of 8.75 ft. is adequate with the same depth as described above. Because of the recuperation of heat in the evaporator, the air compressor will supply 5300 c.f.m. and natural gas will be supplied at the rate of about 29,200 s.c.f.h., with the same excess ratio of air to gas as above described.

The liquid entering the bed will be at a temperature of about 200° F., the combustion gases will enter the bed at about 2800° F. to maintain a bed temperature of 1535° F. and the bed velocity of the gases will be about 6 ft. per second. The output of iron oxide will be of the order of 2900 lbs. per hour, principally in the granular form above described. The gases leave the evaporator and enter the absorber at about 689° F. and are of the following typical composition:

|  | Mole percent |
|---|---|
| $O_2$ | 0.4 |
| $N_2$ | 42.6 |
| $CO_2$ | 5.1 |
| $H_2O$ | 46.8 |
| HCl | 5.1 |

As a third example, the pickle liquor may be assumed to have a lower concentration of $FeCl_2$ and a higher percentage of unreacted HCl. From a 200 ton per hour pickling line, there would be derived 35,300 lbs. of pickle liquor per hour having a composition of 13% $FeCl_2$ and 11% HCl. After passing through the evaporator as shown in FIG. 2, in which the HCl would be removed with the vapors and gases flowing to the absorber, the feed liquid into the bed would contain 18.5% $FeCl_2$ with the balance being principally water. In this case, the diameter of the bed would be approximately 15 feet, the depth the same. The compressor would supply air at the rate of 16,600 c.f.m. and the fuel gas would be supplied at the rate of 142,800 s.c.f.h. and the air-to-gas ratio would be the same as in the foregoing examples. The combustion gases are at a temperature of 2800° F., the bed temperature would be maintained at about 1535° F., and the superficial bed velocity is 6 feet per second.

Iron oxide will be produced at the rate of 2900 lbs./hour equivalent $Fe_2O_3$, liquid feed from the evaporator to the fluidized bed is about 200° F. The gases entering the absorber are at about 230° F. and the composition of the gases are calculated to be:

|  | Mole percent |
|---|---|
| $O_2$ | 9 |
| $N_2$ | 45.7 |
| $CO_2$ | 5.5 |
| $H_2O$ | 44.0 |
| HCl | 3.9 |

From the foregoing it will be apparent that the apparatus may be variously designed and proportioned to take care of conditions on any given pickling line, and that capital cost and availability of space as compared to operating costs should be taken into consideration. Important to the present invention is the discovery that with a fluidized bed temperature at a level of about 1535° F. the great proportion of the ferric oxide produced in the reactor will be of a granulated metallurgically useful character, and that by recycling very fine oxide particles from the cyclone to the fluidized bed, even more of it is recovered in granular form.

We claim:
1. The method for the treatment of spent hydrochloric acid pickle liquor which is comprised of an aqueous solution of iron chloride, in which there usually is some unreacted hydrochloric acid, to recover ferric oxide in granular form therefrom and regenerate hydrochloric acid for reuse in pickling which comprises:
 (a) distributing the spent pickle liquor into a bed of ferric oxide particles contained in a closed reactor,
 (b) fluidizing the bed of ferric oxide particles to heat and maintain a temperature of the bed at about 1535° F. by the passage of hot combustion gases and oxygen through the bed, thereby effecting the conversion of ferrous chloride to ferric oxide and form hydrogen chloride according to the equation

$$2FeCl_2 + 2H_2O + \tfrac{1}{2}O \to Fe_2O_3 + HCl$$

with the ferric oxide being granular, (c) withdrawing the combustion gases, HCl and water vapor from the reactor, (d) passing the gases so withdrawn through an absorber countercurrent to flowing water to dissolve the HCl and condense the water vapor, and (e) withdrawing the granular ferric oxide from the fluidized bed.

2. The method defined in claim 1 in which entrained ferric oxide dust in the combustion gases and vapor removed from the reactor is removed from the gases before they enter the absorber and the dust to be removed is recycled to the reactor for conversion to granular particles.

3. The method defined in claim 1 wherein the gases withdrawn are first passed through a heat exchanger in heat exchange relation to the pickle liquor flowing to the reactor.

4. The method defined in claim 1 in which the combustion gases for fluidizing the bed contains air to supply oxygen to the combustion gases in excess of the stoichiometric requirements for burning the fuel.

5. The method defined in claim 3 wherein HCl and water vapor released from the pickle liquor in said heat exchanger are combined with the combustion gases and vapors flowing to the absorber.

References Cited

UNITED STATES PATENTS

| | | | |
|---|---|---|---|
| 2,155,119 | 4/1939 | Ebner | 23—1 |
| 2,428,221 | 9/1947 | Hudson | 23—154 XR |
| 2,545,314 | 3/1951 | Seebold | 23—154 |
| 2,723,904 | 11/1955 | Reeve | 23—200 |
| 2,771,344 | 11/1956 | Michel et al. | 23—200 |
| 2,950,180 | 8/1960 | Kunzer et al. | 23—154 XR |
| 3,310,435 | 3/1967 | Robinson et al. | 23—154 XR |

EDWARD STERN, *Primary Examiner.*

U.S. Cl. X.R.

23—200